United States Patent [19]
Levon

[11] 3,882,136
[45] May 6, 1975

[54] S-[OMEGA-(1-IMIDAZOLYL)ALKYL]HYDROGEN MONOTHIOSULFATES AND SALTS THEREOF

[75] Inventor: Ernest F. Levon, Evanston, Ill.

[73] Assignee: G. D. Searle & Co., Chicago, Ill.

[22] Filed: Nov. 16, 1973

[21] Appl. No.: 416,382

[52] U.S. Cl. ............... 260/299; 260/309; 424/273
[51] Int. Cl. ............................................ C07d 49/36
[58] Field of Search ........................... 260/309, 299

[56] References Cited
UNITED STATES PATENTS
3,723,453  3/1973  Gradnik et al. .................... 260/309

OTHER PUBLICATIONS

J. Heterocycl. Chem. 3: 472–475, (1966), Parulkar et al.

*Primary Examiner*—Henry R. Jiles
*Assistant Examiner*—S. D. Winters
*Attorney, Agent, or Firm*—John M. Brown

[57] ABSTRACT

S-[Ω-(1-imidazolyl)alkyl] hydrogen thiosulfates and their salts, and the antimicrobial activity thereof, are disclosed.

9 Claims, No Drawings

S-[OMEGA-(1-IMIDAZOLYL) ALKYL]HYDROGEN MONOTHIOSULFATES AND SALTS THEREOF

This invention relates to S-[Ω-(1-imidazolyl)alkyl] hydrogen thiosulfates and their salts, and to processes for the preparation thereof. More particularly, this invention provides novel, unobvious, and useful chemical compounds of the formula

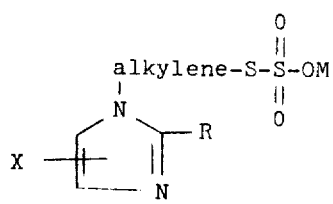

wherein R represents hydrogen, alkyl, or optionally-substituted phenyl; X represents hydrogen or nitro; and M represents hydrogen or one equivalent of any chemically and biologically appropriate cation. Equivalent to the enformulated compounds are solvates thereof in which the solvents are present in biologically insignificant amounts.

Among the alkyls represented by R, lower alkyls are preferred, which is to say methyl, ethyl, propyl, isopropyl, butyl, isobutyl, sec.-butyl, tert.-butyl, pentyl, neopentyl, hexyl, isohexyl, heptyl, and like monovalent, saturated, acyclic, straight- or branched-chain, hydrocarbon groupings of empirical formula —$C_xH_{2x+1}$ wherein $x$ represents a positive integer less than 8. The substituted phenyls represented by R are those in which preferably 1 but as many as 5 halogens, alike or different, are present. Positioning of these halogens (fluorine, chlorine, bromine, and/or iodine) relative to the point of attachment of the phenyl to the imidazolyl nucleus or, where more than 1 is present, to each other is not critical.

Typical cationic embodiments of M, in addition to hydrogen, include alkali metal, ammonium, silver, and alkaline earth metal/2. The term "alkaline earth metal/2" derives, of course, from the fact that alkaline earth metals are divalent; and when, for example, M represents Mg/2, the contemplated compounds are conventionally depicted thus

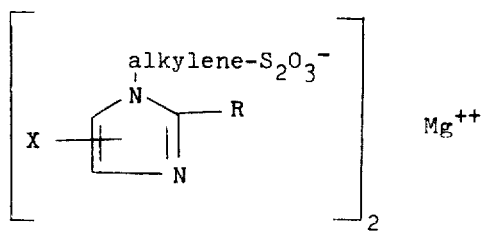

X and R being defined as before.

The alkylenes called for preferably contain more than 1 and fewer than 7 carbons, thus comprising ethylene, trimethylene, propylene, tetramethylene, 1,1-dimethylethylene, 2-methyltrimethylene, pentamethylene, 2,2-dimethyltrimethylene, hexamethylene, and like divalent, saturated, acyclic, straight- or branched-chain hydrocarbon groupings of empirical formula —$C_yH_{2y}$— wherein $y$ represents a positive integer greater than 1 and less than 7.

The compounds to which this invention relates are useful by reason of their valuable biological properties. For example, they are antimicrobial agents adapted to inhibit or prevent the growth of bacteria such as *Bacillus subtilis*, *Diplococcus pneumoniae*, *Staphylococcus epidermidis*, and *Clostridium perfringens*; and protozoa such as *Tetrahymena gelleii*, *Tritrichomonas foetus*, *Trichomonas vaginalis*, and *Pentatrichomonas hominis*.

The utility of the instant compounds in respect of *B. subtilis* and *T. vaginalis* can be demonstrated by the standardized tests described in U.S. Pat. No. 3,668,251. The products of Examples 1, 4C, 9, 12, and 18B hereinafter were active at 1000 mcgm. per ml. when tested against *B. subtilis* as described in the aforesaid patent. When tested against *T. vaginalis* as described therein, the products of Examples 4C and 9 were active at 1000 mcgm. per ml., whereas the products of Example 1 and 18B were active at 10 mcgm. per ml. In the standardized test for efficacy versus *T. gelleii* described in U.S. Pat. No. 3,483,192, the product of Example 1 was active at 10 mcgm. per ml.

Further evidence of the antibacterial utility of the instant compounds is provided by the following standardized test for their capacity to prevent the growth of *Diplococcus pneumoniae*. Beef heart infusion (manufactured by Baltimore Biological Laboratories or Difco) is prepared at twice the concentration recommended by the manufacturer, sterilized, then modified by the addition of 5% sterile Dubos medium serum (Difco), and finally inoculated with 2% (by volume) of a culture of *D. pneumoniae*. Meanwhile, compound is heated in sterile distilled water at a concentration of 2000 mcgm. per ml. and a temperature of 80°C. for 20 minutes. An equivalent mixture of this compound preparation and the inoculated infusion is incubated aerobically at 37°C. for 20–24 hr. and then examined grossly for growth of the organism. If growth no is observed, the incubated mixture is serially diluted and mixed with sufficient additional inoculated infusion to afford concentrations of 100, 10, and 1 mcgm. of compound per ml. The mixtures thus obtained are incubated as before and then examined grossly for growth of the organism. Controls are provided by concurrent incubations identical with the above except that (1) reference standards (4.3, 0.43, 0.043, and 0.0043 mcgm. per ml. of streptomycin sulfate and 6667, 667, 67, and 7 units of potassium penicillin G) are substituted for compound and (2) neither compound nor reference standard is present. Compounds are considered active if, at the maximum concentrations tested, no growth of organism is observed and no aberrancy is apparent in respect of the controls. Potency is expressed as the minimum concentration at which a compound is active. The product of Example 1 was active at 1000 mcgm per ml. in this test.

Still further evidence of the antibacterial utility of the instant compounds is provided by the following standardized test for their capacity to prevent the growth of *Staphylococcus epidermidis*. Nutrient broth (manufactured by Baltimore Biological Laboratories or Difco) is prepared at twice the concentration recommended by the manufacturer, sterlized, and inoculated with 2% (by volume) of a culture of *S. epidermidis* ATCC 12228. Meanwhile, compound is heated in sterile distilled water at sterilized, concentration of 2000 mcgm. per ml. and a temperature of 80°C. for 20 minutes. An equivolume mixture of this compound preparation and the inoculated broth is incubated aerobically at 37°C. for 20–24 hr. and then examined grossly for growth of the organism. If growth is observed, the compound is considered inactive. If no growth is observed, the incubated mixture is serially diluted and mixed with an inoculated broth of the same composition as before, excepting that the concentration is halved and 1% (by volume) of the culture instead of 2% is incorporated. Amounts of the latter broth added are such that concentrations of 100, 10, and 1 mcgm. of compound per ml. result. The mixtures thus obtained are incubated as before and then examined grossly for growth of the organism. Controls are provided by concurrent incubations identical with the above except that (1) reference standards (4.3, 0.43, 0.043, and 0.0043 mcgm. per ml. of streptomycin sulfate and 6667, 667, 67, and 7 units of potassium penicillin G) are substituted for compound and (2) neither compound nor reference standard is present. Compounds are considered active if, at the maximum concentrations tested, no growth of organism is observed and no aberrancy is apparent in respect of the controls. Potency is expressed as the minimum concentration at which a compound is active. The product of Example 1 was active at 1000 mcgm. per ml. in this test.

Evidence of the especially desirable utility of the instant compounds vis-a-vis anaerobic bacteria is provided by the following standardized test. Fluid thioglycollate medium (manufactured by Baltimore Biological Laboratories or Difco) is prepared as recommended by the manufacturer, sterilized, and inoculated with *Clostridium perfringens* ATCC 13124 q.s. one million cells per ml., determined spectrophotometrically. Meanwhile, compound is heated in sterile distilled water at a concentration of 1000 mcgm. per ml. for 20 minutes at 80°C. This compound preparation is serially diluted and mixed with sufficient inoculated medium to afford concentrations of 100, 10, 1, and 0.1 mcgm. of compound per ml. The mixtures thus obtained are incubated anaerobically for 20–24 hr. at 37°C. and then examined grossly for growth of the organism. Controls are provided by concurrent incubations identical with the above except that (1) reference standards (4.3, 0.43, 0.043, and 0.0043 mcgm. per ml. of streptomycin sulfate and 6667, 667, 67, and 7 units of potassium penicillin G) are substituted for compound and (2) neither compound nor reference standard is present. Compounds are considered active if, at the maximum concentrations tested, no growth of organism is observed and no aberrancy is apparent in respect of the controls. Potency is expressed as the minimum concentration at which a compound is active. The product of Example 1 was active at 100 mcgm. per ml. in this test.

Further evidence of the antiprotozoal utility of the instant compounds is provided by a standardized test for their capacity to immobilize *Tritrichomonas foetus* and *Pentatrichomonas hominis* ATCC 30,000. In this test, 80 volumes of a modified Diamond medium prepared by mixing 1200 parts of trypticase (Baltimore Biological Laboratories), 600 parts of yeast extract (Difco), 300 parts of maltose, 60 parts of L-cysteine hydrochloride, 12 parts of L-ascorbic acid, 48 parts of dibasic potassium phosphate, 48 parts of monobasic potassium phosphate, and 54,000 parts of distilled water, adjusting the pH to 6.8 with aqueous 4% sodium hydroxide; incorporating 30 parts of agar (Baltimore Biological Laboratories); boiling for 1 minute to dissolve the agar; and sterilizing is diluted with 20 volumes of sterile Dubos medium serum. The resultant medium is inoculated with 1% (by volume) of either a 48-hr. or a 72-hr. culture of the *T. foetus* or the *P. hominis*. Meanwhile, compound is heated in sterile distilled water at a concentration of 1000 mcgm. per ml. for 20 minutes at 80°C. This compound preparation is serially diluted and mixed with sufficient inoculated medium to afford concentrations of 100, 10, 1 and 0.1 mcgm. per ml. The mixtures thus obtained are incubated anerobically for 49 hr. at 37°C. and then examined microscopically for the presence of motile trichomonads. A concurrent incubation, identical with the foregoing except that no compound is present, serves as control. A compound is considered active if, at the maximum concentrations tested, no motile trichomonads are observed and no aberrancy is apparent in respect of the control. The product of Example 1 was active at 10 mcgm. per ml. against both *T. foetus* and *P. hominis* in this test.

Those skilled in the art will recognize that observations of activity in standardized tests for particular biological effects are fundamental to the development of valuable new drugs, both veterinary and human.

The sodium salts of this invention are readily preparable by heating a 1-(chloroalkyl/methylsulfonyloxyalkyl)imidazole of the formula

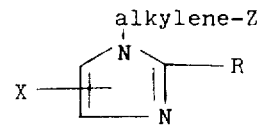

wherein X and R are defined as before and Z represents chlorine or methylsulfonyloxy with sodium monothiosulfate in aqueous ethanol, sodium iodide being incorporated in the reaction mixture as a catalyst when Z represents chlorine. A nitrogen atmosphere may be maintained to minimize undesirable side reactions. The 1-chloroalkyl starting material can be prepared either by heating a corresponding -hydroxyalkylimidazole 1-hydroxylalkylimidazole with thionyl chloride in chloroform, or by heating an imidazole of the formula

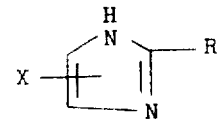

with a tosylate of the formula

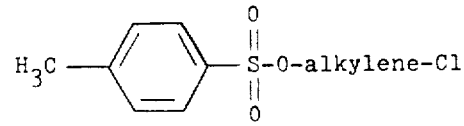

the resultant acid addition salt being converted to the free base by alkalinization. (X and R in the penultimate formula are as previously defined.)

From the sodium salts of this invention, on contacting with hydrochloric acid, the acids of the invention are obtained. These, in turn, are converted to salts of the invention by contacting in ethanol with 1 equivalent of base. As an exception to this procedure, silver and magnesium salts of the invention are conveniently prepared by contacting the sodium salts in aqueous media with 1 equivalent of silver nitrate or 2 equivalents of magnesium sulfate.

The following examples describe in detail compounds illustrative of the present invention and methods which have been devised for their preparation. It will be apparent to those skilled in the art that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

EXAMPLE 1

To a solution of 20 parts of 1-(2-chloroethyl)-2-methyl-5-nitroimidazole [Arzneimittel-Forsch., 16, 23 (1966)] in 80 parts of 95% ethanol is added a solution of 40 parts of sodium thiosulfate pentahydrate and 1 part of sodium iodide in 150 parts of water. The resultant mixture is refluxed at the boiling point under nitrogen for 24 hours, then cooled, washed with toluene, and stripped of solvents by vacuum distillation. The residue is extracted with methanol, and the methanol solution is stripped of solvent by vacuum distillation. The residue thus obtained is recrystallized from a mixture of absolute ethanol and anhydrous ether to give sodium S-[2-(2-methyl-5-nitro-1-imidazolyl)ethyl] monothiasulfate melting at 208°–210° with decomposition.

EXAMPLE 2

To a solution of 10 parts of 2-(2-methyl-5-nitro-1-imidazoly)ethyl methanesulfonate [Ger. 2,030,314] in 400 parts of hot ethanol is added a solution of 15 parts of sodium thiosulfate pentahydrate in 80 parts of water. The resultant mixture is refluxed at the boiling point with stirring for 6 hours, then stripped of solvents by vacuum distillation. The residue is extracted with hot ethanol. The ethanol extract is stripped of solvent by vacuum distillation, and the residue thus obtained is crystallized from absolute ethanol and anhydrous ether to give sodium S-[2-(2-methyl-5-nitro-1-imidazolyl)ethyl] monothiosulfate monohydrate melting at 198°–200°, with decomposition.

EXAMPLE 3

A mixture of 20 parts of 1-(2-chloroethyl)-5-nitroimidazole [Arzneimittel-Forsch., 16, 23 (1966)], 40 parts of sodium thiosulfate pentahydrate, 1 part of sodium iodide, 120 parts of 95% ethanol, and 150 parts of water is refluxed at the boiling point under nitrogen for 24 hours, then stripped of solvent by vacuum distillation. The residue is extracted with hot absolute ethanol. The ethanol solution is stripped of solvent by vacuum distillation, and the residue thus obtained is crystallized from a mixture of absolute ethanol and anhydrous ether to give sodium S-[2-(5-nitro-1-imidazolyl)ethyl] monothiosulfate.

EXAMPLE 4

A. To a suspension of 20 parts of 2-methylimidazole-1-ethanol hydrochloride [Austria 269,135] in 150 parts of chloroform at 25° is added, with stirring, 50 parts of thionyl chloride. When liquefaction is complete, the temperature is raised to 45°–48° for 20 minutes during which considerable effervescence occurs. Excess thionyl chloride and chloroform are removed by vacuum distillation, and the residue is crystallized from an equivolume mixture of 2-propanol and ether to give 1-(2-chloroethyl)-2-methylimidazole hydrochloride melting at 170°–173°.

B. To a mixture of 8 parts of 1-(2-chloroethyl)-2-methylimidazole, 20 parts of methanol, and 70 parts of ether is added a cool solution of 8 parts of potassium carbonate in 8 parts of water. The resultant mixture is triturated with an additional 10 parts of potassium carbonate and the mixture thus obtained is filtered. The filtrate is dried over potassium carbonate and stripped of solvent by vacuum distillation at 25°. The residue is 1-(2-chloroethyl)-2-methylimidazole.

C. To a solution of approximately 6 parts of 1-(2-chloroethyl)-2-methylimidazole in 80 parts of 95% ethanol is added a solution of 15 parts of sodium thiosulfate pentahydrate in 80 parts of water. The resultant mixture is refluxed at the boiling point under nitrogen for 4 hours, then cooled and thereupon stripped of solvent by vacuum distillation. The residue is taken up in 200 parts of warm 95% ethanol. The ethanol solution is filtered, and to the filtrate is added 175 parts of ether. The precipitate thrown down is filtered out, and the filtrate is stripped of solvent by vacuum distillation. The residue is washed with ether and then taken up in 80 parts of absolute ethanol. Approximately 50 parts of benzene is added, whereupon solvents are removed by vacuum distillation. The residue thus obtained is crystallized from a mixture of absolute ethanol and anhydrous ether to give sodium S-[2-(2-methyl-1-imidazolyl)ethyl] monothiosulfate melting at approximately 245°, with decomposition.

EXAMPLE 5

A. To a suspension of 16 parts of 2-methyl-4-nitroimidazole-1-ethanol [Arzneimittel-Forsch., 16, 23 (1966)] in 60 parts of pyridine at 0° ± 5° is slowly added 11 parts of methanesulfonyl chloride. The resultant mixture is stirred for 15 minutes at 0°–5°, then diluted thereat with 60 parts of water. The mixture thus obtained is stirred at 0°–3° for 15 minutes, whereupon insoluble solids are filtered out, washed well with water, and dried in air. The product so isolated is 2-(2-methyl-4-nitro-1-imidazolyl)ethyl methanesulfonate melting in the range, 153°–161°.

B. A solution of 15 parts of 2-(2-methyl-4-nitro-1-imidazolyl)ethyl methanesulfonate and 30 parts of sodium thiosulfate pentahydrate in approximately 1100 parts of 95% ethanol and 500 parts of water is boiled gently with stirring for 2 hours, then stripped of solvent by vacuum distillation. The residue is digested with 325 parts of hot absolute ethanol, and the resultant mixture is filtered. The filtrate is stripped of solvent by vacuum distillation, and the residue thus obtained is crystallized from absolute ethanol to give sodium S-[2-(2-methyl-4-nitro-1-imidazolyl)ethyl] monothiosulfate melting at 200°–205°, with decomposition.

EXAMPLE 6

A solution of 2 parts of sodium S-[2-(2-methyl-5-nitro-1-imidazolyl)ethyl] monothiosulfate in 8 parts of water is acidified with 5 parts of 5% hydrochloric acid. The precipitate which forms is filtered off, washed with ethanol, and dried in air to give S-[2-

(2-methyl-5-nitro-1-imidazolyl)ethyl]hydrogen monothiosulfate melting at approximately 205°.

EXAMPLE 7

To a suspension of 10 parts of S-[2-(2-methyl-5-nitro-1-imidazolyl)ethyl]hydrogen monothiosulfate in 50 parts of ethanol under nitrogen is added 21 parts of aqueous 10% potassium hydroxide. Solvents are removed by vacuum distillation. The residue is potassium S-[2-(2-methyl-5-nitro-1-imidazolyl)ethyl] monothiosulfate.

EXAMPLE 8

Substitution of 13 parts of 10% ammonium hydroxide for the potassium hydroxide called for in Example 7 affords, by the procedure there detailed, ammonium S-[2-(2-methyl-5-nitro-1-imidazolyl)ethyl] monothiosulfate.

EXAMPLE 9

To a solution of 10 parts of sodium S-[2-(2-methyl-5-nitro-1-imidazolyl)ethyl] monothiosulfate in 150 parts of water is added a solution of approximately 6 parts of silver nitrate in 100 parts of water. After one hour, precipitated solids are filtered off, consecutively washed with distilled water and methenol, and dried in vacuo. The product thus isolated is silver S-[2-(2-methyl-5-nitro-1-imidazolyl)ethyl] monothiosulfate.

EXAMPLE 10

A solution of 200 parts of sodium S-[2-(2-methyl-5-nitro-1-imidazolyl)ethyl] monothiosulfate and approximately 42 parts of magnesium sulfate in 3000 parts of water is concentrated by evaporation to the point of incipient precipitation. The precipitate thrown down is magnesium bis-{S-[2-(2-methyl-5-nitro-1-imidazolyl)ethyl] monothiosulfate}, which is isolated by filtration and dried in air.

EXAMPLE 11

Substitution of 14 parts of 10% calcium hydroxide for the potassium hydroxide called for in Example 7 affords, by the procedure there detailed, calcium bis{S-[2-(2-methyl-5-nitro-1-imidazolyl)ethyl] monothiosulfate}.

EXAMPLE 12

A mixture of 100 parts of 1-(2-chloroethyl)-2-ethyl-5-nitroimidazole [Arzneimittel-Forsch., 16, 23 (1966)], 200 parts of sodium thiosulfate pentahydrate, 5 parts of sodium iodide, 400 parts of ethanol, and 750 parts of water is heated and stirred at the boiling point under reflux for 24 hours, then cooled and stripped of solvent by vacuum distillation. The residue is extracted with 800 parts of hot ethanol. The ethanol extract is stripped of solvent by vacuum distillation, and the residue thus obtained is recrystallized from absolute ethanol to give sodium S-[2-(2-ethyl-5-nitro-1-imidazolyl)ethyl] monothiosulfate melting at 203°–208°, with decomposition.

EXAMPLE 13

A. A mixture of 5 parts of 2-methyl-4-nitroimidazole and 25 parts of 3-chloropropyl p-toluenesulfonate is heated at 150°–160° for 2 hours, then cooled and thereupon diluted with 200 parts of water. The resultant mixture is thoroughly washed with toluene, then adjusted to pH 8 with aqueous 10% sodium hydroxide. The mixture thus obtained is extracted with toluene. The toluene extract is washed with water, dried over potassium carbonate, and stripped of solvent by vacuum distillation. The syrupy residue is slurried with 5 parts of aluminum oxide in approximately 35 parts of ethyl acetate. The slurry is filtered, and the filtrate is stripped of solvent by vacuum distillation. The residue is consecutively mixed with 8 parts of 2-propanol and 1 part of a 25% solution of hydrogen chloride in 2-propanol. The precipitate thrown down is 1-(3-chloropropyl)-2-methyl-5-nitroimidazole hydrochloride which, filtered off and dried in air, sinters at approximately 150° and melts in the range, 173°–181°, with decomposition.

B. To a solution of 10 parts of 1-(3-chloropropyl)-2-methyl-5-nitroimidazole hydrochloride in approximately 150 parts of water is added, with due regard for effervescence, excess potassium carbonate. The resultant mixture is extracted with chloroform. The chloroform extract is dried over potassium carbonate and then stripped of solvent by vacuum distillation. Approximately 20 volumes of ether is distilled from the residue. The material which remains is 1-(3-chloropropyl)-2-methyl-5-nitroimidazole melting at 37°–40°.

C. A mixture of approximately 11 parts of 1-(3-chloropropyl)-2-methyl-5-nitroimidazole, 20 parts of sodium thiosulfate, 1 part of sodium iodide, 100 parts of ethanol, and 120 parts of water is stirred and heated at the boiling point under reflux in a nitrogen atmosphere for 6 hours. Solvents are thereupon removed by vacuum distillation, and ethanol and benzene are distilled from the residue to remove traces of moisture azeotropically. The resultant material is slurried with 10 volumes of benzene, and the slurry is filtered. Solvent is removed from the filtrate by vacuum distillation, whereupon the residue is extracted with 800 parts of hot absolute ethanol. The ethanol extract is cooled and then diluted with 350 parts of anhydrous ether. The precipitate which forms is filtered off, and the filtrate is stripped of solvent by vacuum distillation. The residue thus obtained, upon repeated recrystallization from mixtures of ethanol and ether, followed by recrystallization from ethanol alone, affords sodium S-[3-(2-methyl-5-nitro-1-imidazolyl)propyl] monothiosulfate melting at approximately 160°.

EXAMPLE 14

A. Substitution of 20 parts of α,2-dimethyl-5-nitroimidazole-1-propanol hydrochloride [Arzneimittel-Forsch., 16, 23 (1966)] for the 2-methylimidazole-1-ethanol called for in Example 4A affords, by the procedure there detailed, 1-(3-chlorobutyl)-2-methyl-5-nitroimidazole hydrochloride.

B. Substitution of 8 parts of 1-(3-chloro-2-methylpropyl)-2-methyl-5-nitroimidazole hydrochloride for the 1-(2-chloroethyl)-2-methylimidazole hydrochloride called for in Example 4B affords, by the procedure there detailed, 1-(3-chlorobutyl)-2-methyl-5-nitroimidazole.

C. Substitution of approximately 6 parts of 1-(3-chlorobutyl)-2-methyl-5-nitroimidazole for the 1-(2-chloroethyl)-2-methylimidazole called for in Example 4C affords, by the procedure there detailed, sodium S-[1-methyl-3-(2-methyl-5-nitro-1-imidazolyl)propyl] monothiosulfate.

EXAMPLE 15

A. Substitution of 25 parts of 2-methyl-5-nitroimidazole-1-hexanol hydrochloride [Arzneimittel-Forsch., 16, 23 (1966)] for the 2-methylimidazole-1-ethanol called for in Example 4A affords, by the procedure there detailed, 1-(6-chlorohexyl)-2-methyl-5-nitroimidazole hydrochloride.

B. Substitution of 8 parts of 1-(6-chlorohexyl)-2-methyl-5-nitroimidazole hydrochloride for the 1-(2-chloroethyl)-2-methylimidazole hydrochloride called for in Example 4B affords, by the procedure there detailed, 1-(6-chlorohexyl)-2-methyl-5-nitroimidazole.

C. Substitution of approximately 6 parts of 1-(6-chlorohexyl)-2-methyl-5-nitroimidazole for the 1-(2-chloroethyl)-2-methylimidazole called for in Example 4C affords, by the procedure there detailed, sodium S-[6-(2-methyl-5-nitro-1-imidazolyl)hexyl] monothiosulfate.

EXAMPLE 16

A. Substitution of 22 parts of 5-nitro-2-phenylimidazole-1-ethanol [U.S. Pat. No. 3,682,949] for the 2-methyl-4-nitroimidazole-1-ethanol called for in Example 5A affords, by the procedure there detailed, 2-(5-nitro-2-phenyl-1-imidazolyl)ethyl methanesulfonate.

B. Substitution of approximately 12 parts of 2-(5-nitro-2-phenyl-1-imidazolyl)ethyl methanesulfonate for the 2-(2-methyl-5-nitro-1-imidazolyl)ethyl methanesulfonate called for in Example 2 affords, by the procedure there detailed, sodium S-[2-(5-nitro-2-phenyl-1-imidazolyl)ethyl] monothiosulfate.

EXAMPLE 17

A. Substitution of 34 parts of 2-(o-iodophenyl)-5-nitroimidazole-1-ethanol [U.S. Pat. No. 3,682,949] for the 2-methyl-5-nitroimidazole-1-ethanol called for in Example 5A affords, by the procedure there detailed, 2-[2-(o-iodophenyl)-5-nitro-1-imidazolyl]ethyl methanesulfonate.

B. Substitution of 18 parts of 2-[2-(o-iodophenyl)-5-nitro-1-imidazolyl]ethyl methanesulfonate for the 2-(2-methyl-5-nitro-1-imidazolyl)ethyl methanesulfonate called for in Example 2 affords, by the procedure there detailed, sodium S-{2-[2-(o-iodophenyl)-5-nitro-1-imidazolyl]ethyl } monothiosulfate.

EXAMPLE 18

A. To a solution of 30 parts of 2-(p-fluorophenyl)-5-nitroimidazole-1-ethanol [U.S. Pat. No. 3,682,949] in 100 parts of pyridine at −10° is slowly added approximately 16 parts of methanesulfonyl chloride. The resultant mixture is stirred at −10° for 15 minutes, then cautiously diluted with 5 volumes of water. The mixture thus obtained is extracted with ether. The ether extract is dried over potassium carbonate and then stripped of solvent by vacuum distillation. Approximately 25 volumes of heptane is distilled from the residue to remove remaining traces of pyridine. The material so isolated is 2-[2-(p-fluorophenyl)-5-nitro-1-imidazolyl]ethyl methanesulfonate.

B. To a solution of 2 parts of 2-[2-(p-fluorophenyl)-5-nitro-1-imidazolyl]ethyl methanesulfonate in 15 parts of 95% ethanol is added a solution of 3 parts of sodium thiosulfate pentahydrate in 15 parts of water. The resultant mixture is heated at the boiling point under reflux in a nitrogen atmosphere for 2 hours, then stripped of solvent by vacuum distillation. The residue is extracted with absolute ethanol. The ethanol extract is stripped of solvent by vacuum distillation, and the residue thus obtained is digested overnight at room temperatures with 2 volumes of absolute ethanol. Insoluble solids are thereupon filtered out and recrystallized from ethanol to give sodium S-{2-[2-(p-fluorophenyl)-5-nitro-1-imidazolyl]ethyl } monothiosulfate hemihydrate, melting at approximately 186°, with decomposition. Water of crystallization can be removed by warming the solvated product in vacuo.

What is claimed is:

1. A compound of the formula

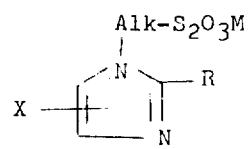

wherein R represents hydrogen, lower alkyl, phenyl, or halophenyl; X represents hydrogen or nitro; Alk represents alkylene containing more than 1 and fewer than 7 carbons; and M represents hydrogen, alkali metal, ammonium, silver, or alkaline earth metal/2.

2. A compound according to claim 1 having the formula

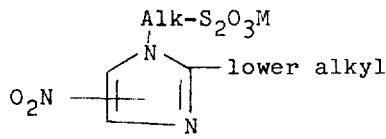

wherein Alk represents alkylene containing more than 1 and fewer than 7 carbons and M represents hydrogen, alkali metal, ammonium, silver, or alkaline earth metal/2.

3. A compound according to claim 1 having the formula

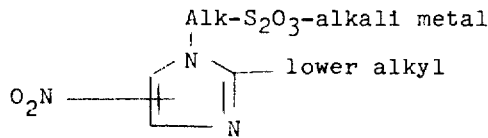

wherein Alk represents alkylene containing more than 1 and fewer than 7 carbons.

4. A compound according to claim 1 having the formula

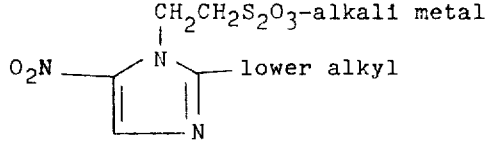

5. A compound according to claim 1 which is sodium S-[2-(2-methyl-5-nitro-1-imidazolyl)ethyl] monothiosulfate.

6. A compound according to claim 1 which is silver S-[2-(2-methyl-5-nitro-1-imidazolyl)ethyl] monothiosulfate.

7. A compound according to claim 1 which is S-[2-(2-methyl-5-nitro-1-imidazolyl)ethyl]hydrogen monothiosulfate.

8. A compound according to claim 1 having the formula

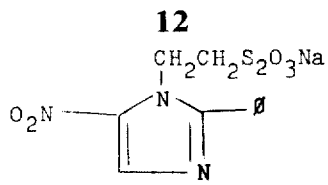

wherein φ represents phenyl optionally substituted by halogen.

9. A compound according to claim 1 which is sodium S-{2-[2-(p-fluorophenyl)-5-nitro-1-imidazolyl]ethyl} monothiosulfate.

* * * * *